United States Patent [19]

Kass et al.

[11] Patent Number: 4,763,576

[45] Date of Patent: Aug. 16, 1988

[54] DETONATING ENERGY TRANSMITTAL DEVICE

[75] Inventors: Robert E. Kass, Mt. Prospect; Robert J. Frederick, Barrington; Louis L. Hallock, Lake Zurich, all of Ill.

[73] Assignee: Angus Chemical Company, Northbrook, Ill.

[21] Appl. No.: 861,489

[22] Filed: Apr. 21, 1986

Related U.S. Application Data

[63] Continuation-in-part of Ser. No. 709,749, Mar. 8, 1985, abandoned.

[51] Int. Cl.$^4$ .......................... F42B 3/00; C06B 25/36; B32B 3/26
[52] U.S. Cl. .................................. 102/321; 102/331; 149/88; 149/89; 428/306.6; 428/313.3; 428/316.6; 428/406; 128/906
[58] Field of Search ................. 149/89, 88; 428/306.6, 428/313.3, 316.6, 406, 906; 102/321, 331

[56] References Cited

U.S. PATENT DOCUMENTS

| | | | |
|---|---|---|---|
| 3,902,933 | 9/1975 | Chandler | 149/89 |
| 3,917,547 | 11/1975 | Massey | 428/406 |
| 3,977,921 | 8/1976 | Chandler | 149/89 |
| 4,076,562 | 2/1978 | Forsythe | 149/89 |
| 4,144,372 | 3/1979 | Beck | 428/283 |
| 4,259,092 | 3/1981 | Matsuo et al. | 428/906 |
| 4,362,778 | 12/1982 | Anderson et al. | 428/313.5 |

Primary Examiner—Edward A. Miller
Attorney, Agent, or Firm—Leydig, Voit & Mayer

[57] ABSTRACT

A detonating energy transmittal device is provided which, when combined with even relatively low-power blasting caps, is capable of promoting and initiating the explosive detonation of liquid nitromethane, which device comprises a plurality of layers of foam material, an effective amount of frangible articles carried on at least one surface of the foam material layers and forming thereon a substantially continuous layer intermediate the adjacent foam material layer, and a cavity capable of accommodating a blasting cap and of placing said blasting cap in intimate contact with said plurality of foam material layers. Methods for detonating fluid explosives also are provided.

21 Claims, 1 Drawing Sheet

DETONATING ENERGY TRANSMITTAL DEVICE

This application is a continuation-in-part of our prior U.S. application, Ser. No. 709,749, filed Mar. 8, 1985, now abandoned.

FIELD OF THE INVENTION

This invention is directed to devices which enhance the detonating effect of blasting caps, by providing for more efficient transmission of the energy released from a blasting cap to and/or through explosive substances, and in particular, liquid explosives such as nitroparaffins. The device thereby reduces the total amount of energy which must be released by the blasting cap to initiate an explosion. Such devices will be referred to herein as detonating energy transmittal ("DET") devices.

BACKGROUND OF THE INVENTION

Because explosive materials are inherently dangerous, there is extensive government regulation concerning their manufacture, use, and transportation. That danger necessarily makes the business of explosives expensive as well. Consequently, explosive materials which are relatively safe to handle, but which must be primed or sensitized immediately prior to detonation are highly desirable.

Nitromethane, for example, is an extremely powerful explosive, yet it is very stable. Unfortunately, it is so stable that its reliable detonation has been a problem which even today is not remedied completely.

It is well known that nitromethane can be sensitized by incorporating, usually with gelled nitromethane, sensitizing compounds, e.g., nitromethane soluble amines, or sensitizing materials, e.g., microspheres or microballoons. Microspheres are frangible articles and generally are very small, spherically shaped, and made of glass or glass-like substance. Microballoons are microspheres which have a hollow, gas-containing cavity.

Unfortunately, conventional nitromethane gels usually cannot be made at the site of their intended use, and they must be transported and handled in their sensitized condition. Safety concerns are increased correspondingly. Thus, DET devices have been developed which can enhance the detonating effect of conventional blasting caps to enable them to detonate nitromethane.

For example, U.S. Pat. No. 3,794,534 to O. Chandler (Chandler) discloses a DET device which comprises an open-celled polymeric foam having microballoons dispersed within and embedded on the surface of the foam. A preferred method of making the DET device comprises mixing the microspheres in a foam monomer and then foaming the monomer. Another preferred method comprises shaking or tumbling relatively thin pieces or shreds of a foam in microspheres to embed or enmesh the microspheres in the foam at its surface.

U.S. Pat. No. 3,797,392 to R. Eckels (Eckels) also discloses a DET device. The Eckels DET device is formed from, inter alia, a porous body and microspheres. The microspheres are spatially located in a relatively inhomogeneous fashion and are intimately dispersed in the porous material. A preferred method of making such DET devices comprises mixing microspheres in a urethane foam resin and then curing the resin into a foam.

Unfortunately, the DET devices disclosed in Chandler and Eckels require relatively strong blasting caps for detonation of liquid nitroparaffins. For example, the Chandler device in combination with a No. 10 blasting cap successfully detonates nitromethane. Chandler discloses, however, that if the microspheres are secured to the foam surface by an adhesive, as opposed to dispersing and embedding them in the foam surface, the DET device did not enable even a No. 16 blasting cap to detonate nitromethane. The microsphere-dispersed-foam DET devices of Eckels appear to offer some improvement, it being disclosed therein that No. 6 blasting caps are capable of detonating nitromethane when combined with the Eckels DET devices.

Prior to the present invention, it was not thought possible to detonate liquid nitromethane with relatively low power blasting caps, such as a No. 3 cap. Because their relatively low power makes them safer to handle, however, No. 3 blasting caps are preferred over Nos. 6, 8, 10 or 16 blasting caps. Also, because they are less expensive than higher-numbered blasting caps, No. 3 caps are preferred for cost reasons.

Thus, it is a general object of this invention to provide a DET device which permits the detonation of a body of liquid nitromethane through the use of a safer, less expensive, relatively low-power blasting cap.

Another object is to provide a method of explosively detonating liquid nitromethane, through the use of an improved DET device in combination with a relatively low-power blasting cap, e.g., a No. 3 blasting cap.

These and other objects and advantages of the invention will be apparent to those skilled in the art upon reading the following detailed description and upon reference to the drawings.

SUMMARY OF THE INVENTION

In accordance with the foregoing objects, the present invention provides for a novel DET device which, when combined with even a relatively low-power blasting cap, is capable of detonating liquid nitromethane, which device comprises, in combination, a plurality of layers of foam material, frangible articles carried on at least one surface of the foam material layers and forming thereon a substantially continuous layer, and a cavity capable of accommodating a blasting cap.

The present invention further provides for a method of explosively detonating a body of a fluid explosive, which method comprises immersing in the body of fluid explosive a combination comprising a DET device of the present invention and a blasting cap, and subsequently detonating the combination.

BRIEF DESCRIPTION OF THE DRAWINGS

Throughout the drawings, like reference numerals refer to like parts.

DETAILED DESCRIPTION OF THE INVENTION

Figure 1:
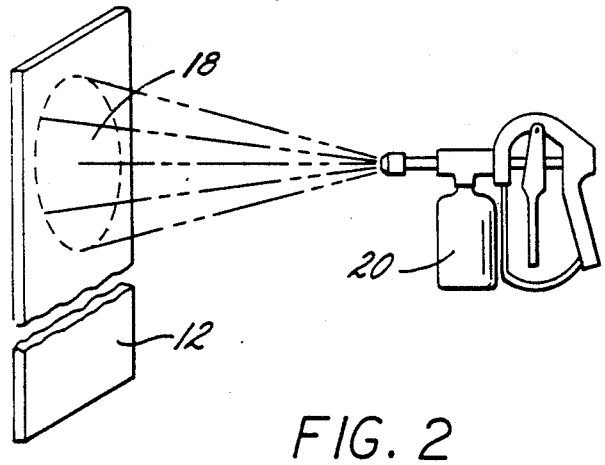
FIGS. 1–4 are an illustration presenting a first preferred method, in four steps, of making a first preferred embodiment (shown in FIG. 4) of the DET device of the present invention.

The novel DET devices and methods of the present invention generally are predicated on the discovery that substantially continuous layers of frangible articles carried on and intermediate adjacent surfaces of the foam layers provide for greater enhancement of the detonating effect of blasting caps. While applicants do not wish to be bound to any theory, it is believed that the substantially continuous layer of frangible articles leads to improved propagation of the detonating shock wave and transmits the shock wave throughout the nitromethane more efficiently than prior art DET devices. In any event, the DET devices of the present invention enable the detonation of liquid nitromethane with blasting caps having detonating power as low as a No. 3 blasting cap. Yet, until the DET device is combined with a No. 3 blasting cap and brought into contact with liquid nitromethane, the DET device, the No. 3 blasting cap, and the nitromethane each are relatively insensitive to detonation and thus are safe for handling.

The DET devices and methods of the present invention will be described and illustrated primarily in the context of liquid nitromethane. Other explosives ordinarily or marginally detonatable with blasting caps and sufficiently fluid to flow into intimate contact with the frangible articles, however, may be detonated using a combination of a blasting cap and the DET devices of the present invention. Such explosives may be in gaseous, liquid, or flowable slurry states, and include, for example, nitroglycerine, ethylene glycoldinitrate, ethylnitrate, methylnitrate, and nitroparaffins, such as tetranitromethane and dinitromethane. Other fluid explosives may be more or less sensitive to detonation, and accordingly, higher or lower powered blasting caps may be used. Nevertheless, as with nitromethane, when combined with the DET devices of the subject invention lower power blasting caps may be used to detonate such fluid explosives.

As used herein, the term "foam material" is defined as a synthetic, somewhat-absorbent foam material such as open-celled polyurethane, polystyrene, or the like. Preferably, a polyester polyurethane foam having a density of about 1.8 pounds per cubic foot ($lb/ft^3$) (more particularly described below) is used as the foam material 12, 30, in accordance with the present invention. Whereas some nitromethane may be absorbed by the foam, this is not the principal function of the foam. The foam is a convenient porous substrate which allows for a nearly continuous distribution of sensitive microspheres throughout the DET device and permits the free-flow of nitromethane into intimate contact with the frangible articles.

The frangible articles referred to herein are preferably microballoons. Especially preferred are C 15-250 microballoons, commercially available from Minnesota Mining and Manufacturing Corporation of St. Paul, Minn. A gas, $SO_2$, is entrapped in these microballoons at an absolute pressure about $\frac{1}{3}$ of an atmosphere (atm). They have a nominal average particle density of 0.15 grams per cubic centimeter, an average pressure of 250 pounds per square inch is required to collapse 10% of the glass microballoons (ASTM D 3102-72), and the average particle size (90% of the total by weight) of the microballoons is between 20 and 130 microns in diameter.

The choice of C 15-250 microballoons is not critical, however, and there exists a great many other gas-containing microballoons which would function in a like manner. Further, neither $SO_2$ nor $\frac{1}{3}$ atm absolute pressure is believed to be critical in this invention; and microballoons containing an inert gas, e.g., nitrogen, argon, etc., it is believed, would function in a like manner. Still further, other subatmospheric pressures, e.g., $\frac{2}{3}$ or 1/6 atm, or superatmospheric pressures, e.g., 2 atm it is believed, would function in a like manner, in accordance with the present invention.

The choice of gas-containing microballoons is also not critical, as it is believed that solid microspheres would function in a like manner, also in accordance with the present invention.

EXAMPLE NO. 1

A first preferred method (FIGS. 1-4) of making a first preferred embodiment of the DET device 10 of the present invention is described below.

A polyester polyurethane foam (commercially available from the Scott Paper Company), having a thickness of about 30 mils and a density from about 1.5 to about 2.0 $lb/ft^3$, was formed into rectangular strips 12 about $2\frac{1}{2}$" wide and 100" long. The foam strips 12 were "non-reticulated", i.e., the foam cell-wall characteristics were not changed after the foam was formed.

A spraying device 20 was used to spray adhesive material 18 (FIG. 1,) on the front and back surfaces of the strip 12. Preferred adhesive materials 18 include solvent-based rubber adhesives, e.g., EC 4500, commercially available from Minnesota Mining & Manufacturing Corp., commercially available vinyl acrylic (emulsion) adhesives, and epoxy type adhesives. The former two were employed in this Example. It is believed the choice of adhesive is not critical, however, and that other application methods may be used, e.g., brushing or rolling the adhesive or dipping the foam into adhesive.

Figure 2:
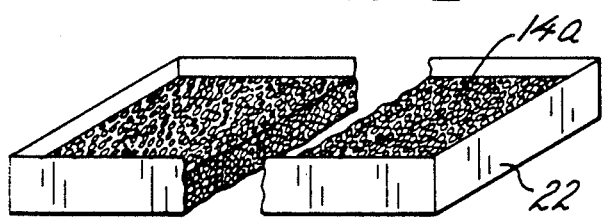

Next, the adhesive-sprayed surfaces of the strip 12 were brought into intimate contact with C 15-250 microballoons 14a by being immersed into an elongated bin 22 containing the microballoons 14a (FIG. 2). The adhesive material 18 then was allowed to dry and permanently bond the microballoons 14a to both sides of the foam strip 12.

It should be noted, however, that it is not necessary to carry a substantially continuous layer of frangible articles on both sides of the foam strip. A layer on one side of each of the foam strips generally will suffice.

Figure 3:
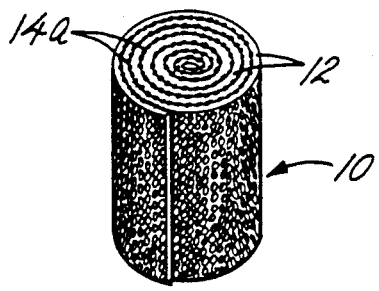
Figure 4:
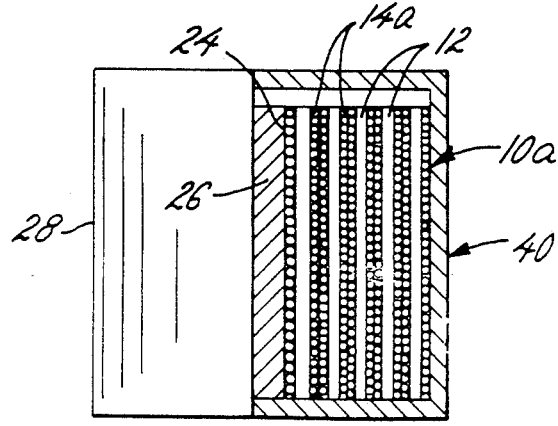

After the microballoons 14a were thus bonded to the foam strip 12, the strip 12 was formed into a preselected shape, in this example, a cylinder of about $2\frac{1}{2}$" diameter (FIG. 3). As is apparent from Example 4, however, other shapes may be employed.

When using the solvent-based rubber adhesive material, it was noted that about 5 to 6 percent of the total volume (vol %) of the unfinished DET device 10 was composed of microballoons 14a. When using the vinyl acrylic adhesive material, it was noted that about 8 vol % of the unencased DET device 10 was composed of microballoons 14a.

Next a cavity having an inner surface 24 was formed (FIG. 4) in the unfinished DET device 10 for receiving a No. 3 blasting cap 26 therein. The cavity is cylindrically shaped, axially-disposed and centrally-located in the unencased DET device 10a, and suitably dimensioned to accommodate snugly the No. 3 blasting cap 26. For a No. 3 blasting cap, a cavity having a diameter of about one-quarter inch provided excellent results.

The unfinished DET device 10a itself was then disposed into a suitably dimensioned container 28 (FIG. 4) to form the DET device 40. The container 28 is cylindrical and has a diameter only relatively slightly greater than the outer diameter of the unencased DET device 10a.

It should be noted that DET devices of the present invention include both unencased and encased devices. A container enhances the structural integrity of a DET device and protects it during handling. Containers thus are preferred.

The above-described method (FIGS. 1-4) was used to make four DET devices 40, two of which included the solvent-based rubber adhesive material and the other two of which included the vinyl acrylic adhesive material, and four tests were conducted to evaluate the efficacy of the DET device 40. A No. 3 blasting cap was disposed in each DET device 40 and approximately 175 grams of nitromethane were added to the container 28, i.e., a quantity sufficient to fill the container 28 up to the top of the device. Upon the addition of the nitromethane the polyester polyurethane foam strip 12 swelled slightly (giving the rolled-up strip 12 the appearance of a "jellyroll"), and caused the device to fit snugly within the container 28.

When either the solvent-based or the vinyl acrylic adhesive material was used the nitromethane was detonated using a No. 3 blasting cap, but failed to detonate using a No. 1 blasting cap. This indicates that when the DET device of the present invention is employed, nitromethane can be detonated with a lower-powered blasting cap than blasting caps previously used.

EXAMPLE 2

For comparative purposes, a DET device otherwise identical to the DET device 40, was made by slurrying the microballoons in a commercially-available starch-based adhesive solution and impregnating the microballoon slurry into the foam strips, as opposed to carrying the microballoons on the foam surface. The DET device, however, did not enable a No. 3 blasting cap to detonate nitromethane.

EXAMPLE 3

To enable further comparison, microballoons were added to a two-component, commercially-available urethane foam system. An open-cell, composite type foam then was formed with the microballoons embedded therein. A DET device formed from this composite also did not enable a No. 3 blasting cap to detonate nitromethane.

EXAMPLE 4

A second preferred method (FIGS. 5-9) may be employed to make a second preferred embodiment of the DET device 50 of the present invention.

Figure 5:
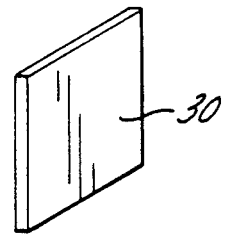
FIGS. 5–9 are an illustration presenting a second preferred method, in five steps, of making a second preferred embodiment (shown in FIG. 9) of the DET device of the present invention.
Figure 6:
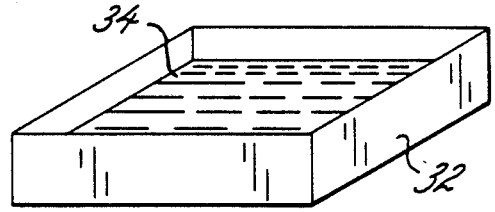
Figure 7:
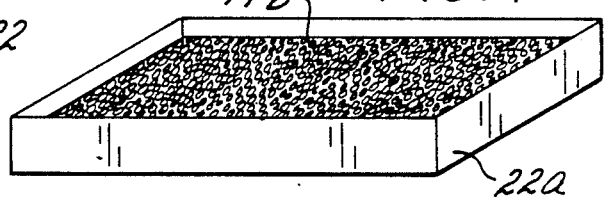
Figure 8:
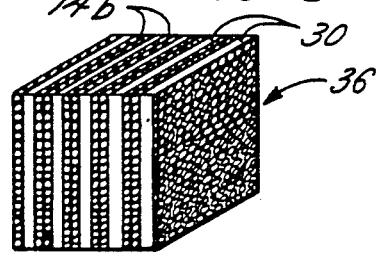

Polyester polyurethane foam (No. 20 Scott Foam, commercially available from the Scott Paper Company), reticulated to give an open-cell structure, was formed into 2" squares 30 of ½" thickness (FIG. 5). The foam squares 30 then were dipped into a vat 32 containing a freshly-prepared 5% acetone solution of a 1:1 epoxy:polyamide-based adhesive 34 (FIG. 6) for applying the adhesive 34 to the surfaces of each foam square 30.

After the acetone evaporated, but before the epoxy:polyamide adhesive 34 cured, each foam square 30 was dipped into a bin 22a of C 15-250 microballoons 14b (FIG. 7) to cause the microballoons 14b to adhere to spaced opposite surfaces of each foam square 30 for providing a continuous glass or glass-like layer intermediate adjacent foam squares 30.

Figure 9:
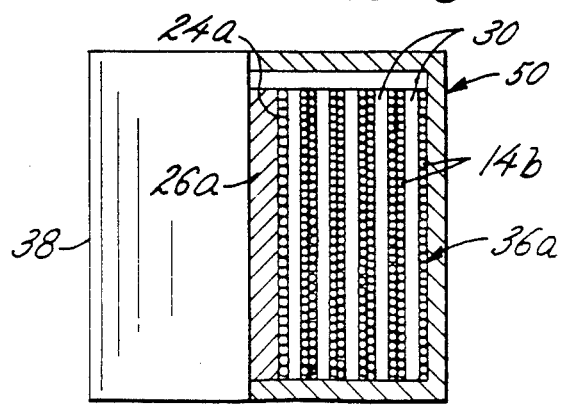

Next, a plurality of foam squares 30 having the microballoons 14b bonded thereto were assembled into a cube 36 about 360 milliliters in volume having alternating layers of polyester polyurethane foam squares 30 and microballoons 14b (FIG. 9). In this example about 9.2 vol % of the cube 36 (of the present invention) was found to consist of microballoons 14b.

Then, the DET device 36 was placed into a polyethylene container 38, a cavity having an inner surface 24a was formed in the cube for receiving a No. 3 blasting cap, a No. 3 blasting cap 26a was placed into the cavity, and the polyethylene container 38 was filled with nitromethane (not shown). The nitromethane contributed about 93% of the total weight of the DET device 50 and the No. 3 blasting cap 26a. The nitromethane was successfully detonated using the above-described DET device 50 and No. 3 blasting cap 26a.

Throughout this application, it is to be understood that figures depicting microballoon dimensions in relation to foam sheet and foam square thicknesses are for purposes of illustrating the present invention, and that actual microsphere dimensions may be somewhat lesser in dimension relative to foam strip and square thicknesses than is shown herein. Microspheres are described as being substantially spherical in shape; but they need not be spherical.

It will be noted that the novel DET device of the present invention, because it can be used with a No. 3 blasting cap, allows for relatively more energy efficient detonation of nitromethane. Also, because the DET device is itself not explosive, the No. 3 blasting cap is relatively low power, and nitromethane is relatively stable, the subject invention increases the safety of blasting operations using nitromethane.

Further, the present invention is capable of promoting detonation of liquid nitromethane with a relatively low power blasting cap, of which the No. cap 3 is a representative example; as distinguished from a higher power cap such as, for example, a No. 6 cap which is known to be a higher power detonator in the explosives art and is a standard. It should be understood that, under certain conditions, a cap of lower power than No. 3 may detonate nitromethane when combined with a DET device encompassed by this invention. Obviously, a cap of higher power than a No. 3 cap would be expected to cause detonation when combined with such DET devices.

While the present invention has been illustrated and described with reference to preferred embodiments, it can be appreciated that it is not limited thereto. On the contrary, alternatives, changes, or modifications may become apparent to those skilled in the art upon reading the foregoing description. For example, flat unlayered sheets of foam material carrying a substantially continuous layer of frangible articles adhesively bonded thereto, made available for assembly of custom-sized detonation-promoting devices, would be within contemplation of the present invention, as they embody the inventive step of the continuous frangible layer. Accordingly, such alternatives, changes and modifications are to be considered as forming a part of the invention insofar as they fall within the spirit and scope of the appended claims.

We claim:

1. A DET device which comprises, in combination, a plurality of layers of superposed foam material, frangible articles adhesively carried on at least one surface of said foam material layers and forming thereon a substantially continuous layer, and a substantially centrally oriented cavity capable of snugly accommodating a blasting cap, the dimensions and number of said foam and frangible article layers being coordinated such that said DET device, when combined with a blasting cap of lower power than that of a No. 6 cap, is capable of detonating liquid nitromethane.

2. The DET device of claim 1 wherein said foam material is a polyester polyurethane foam having a density of about 1.5 to about 2.0 lb/ft$^3$.

3. The DET device of claim 1 wherein said frangible articles are gas-containing microballoons having an absolute pressure of about $\frac{1}{3}$ atm.

4. The DET device of claim 1 wherein said frangible articles are solid microspheres.

5. The DET device of claim 1 wherein said frangible articles are bonded adhesively to said foam material surfaces intermediate adjacent surfaces of said foam material layers.

6. The DET device of claim 1 comprising a container.

7. The DET device of claim 1 in combination with a blasting cap disposed within said cavity.

8. The DET device of claim 2 in combination with a blasting cap disposed within said cavity.

9. The DET device of claim 3 in combination with a blasting cap disposed within said cavity.

10. The DET device of claim 4 in combination with a blasting cap disposed within said cavity.

11. The DET device of claim 5 in combination with a blasting cap disposed within said cavity.

12. The DET device of claim 6 in combination with a blasting cap disposed within said cavity.

13. The DET device of claim 1 in combination with a No. 3 blasting cap disposed within said cavity.

14. A method of explosively detonating a body of a fluid explosive which comprises (a) immersing in said body of fluid explosive the DET device of claim 1 in combination with a blasting cap disposed within said cavity, and (b) subsequently detonating said blasting cap.

15. The method of claim 14, wherein said fluid explosive is liquid nitromethane.

16. A method of explosively detonating a body of a fluid explosive which comprises (a) immersing in said body of fluid explosive the DET device of claim 2 in combination with a blasting cap disposed within said cavity, and (b) subsequently detonating said blasting cap.

17. A method of explosively detonating a body of a fluid explosive which comprises (a) immersing in sai body of fluid explosive the DET device of claim 3 in combination with a blasting cap disposed within said cavity, and (b) subsequently detonating said blasting cap.

18. A method of explosively detonating a body of a fluid explosive which comprises (a) immersing in said body of fluid explosive the DET device of claim 4 in combination with a blasting cap disposed within said cavity, and (b) subsequently detonating said blasting cap.

19. A method of explosively detonating a body of a fluid explosive which comprises (a) immersing in said body of fluid explosive the DET device of claim 5 in combination with a blasting cap disposed within said cavity, and (b) subsequently detonating said blasting cap.

20. A method of explosively detonating a body of a fluid explosive which comprises (a) immersing in said body of fluid explosive the DET device of claim 6 in combination with a blasting cap disposed within said cavity, and (b) subsequently detonating said blasting cap.

21. The method of claim 14 wherein said blasting cap is a No. 3 blasting cap.

* * * * *